July 31, 1945.  J. H. WALBORN  2,380,712

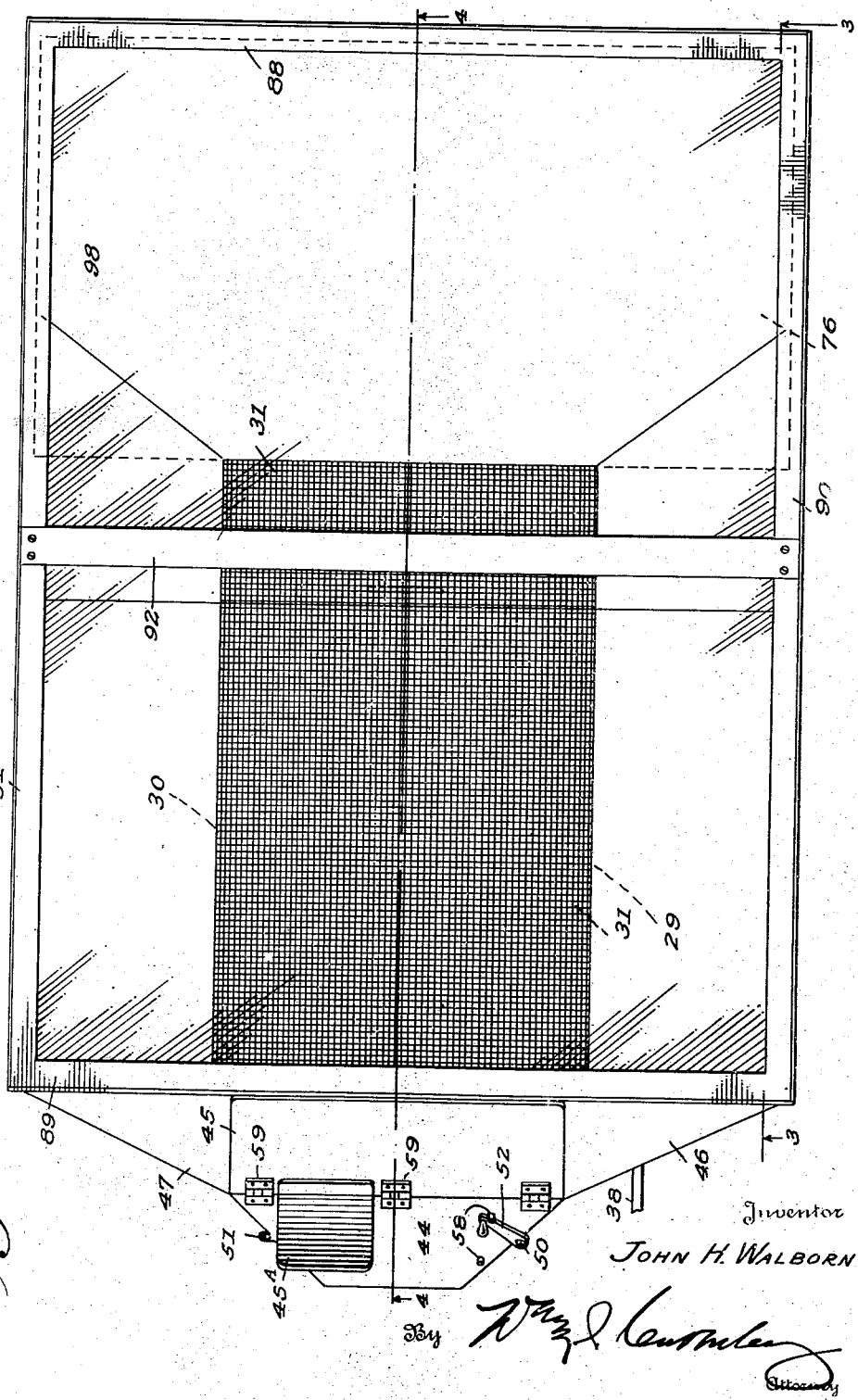

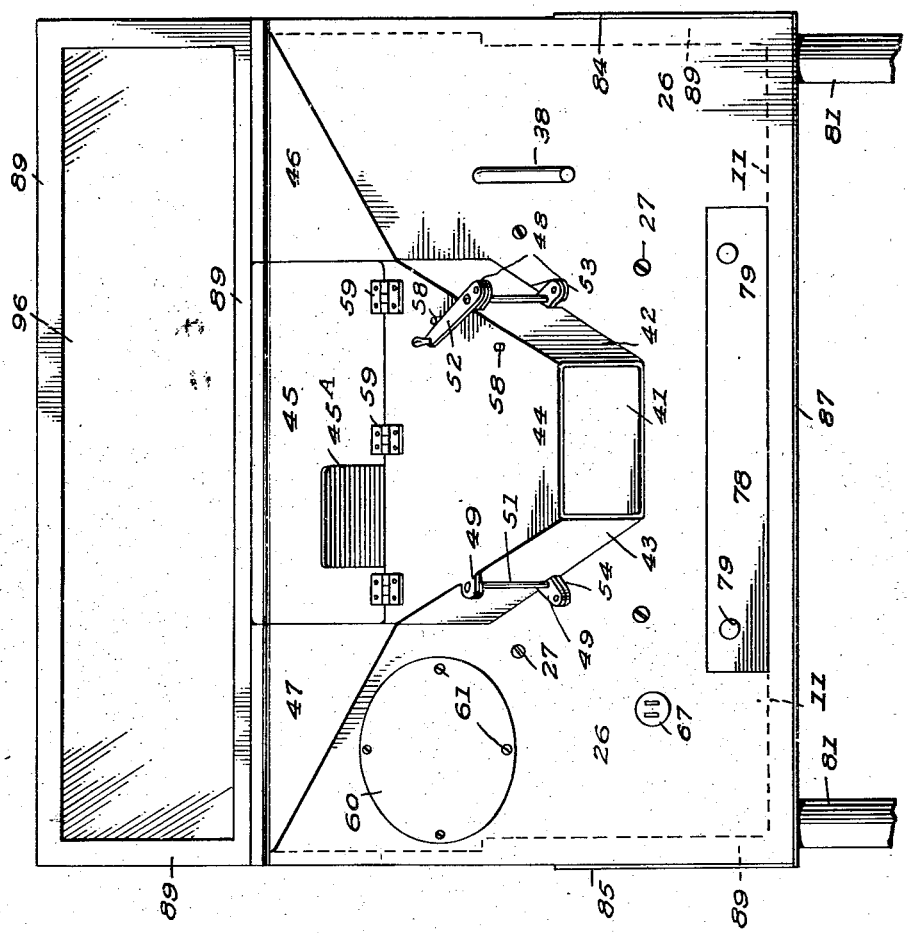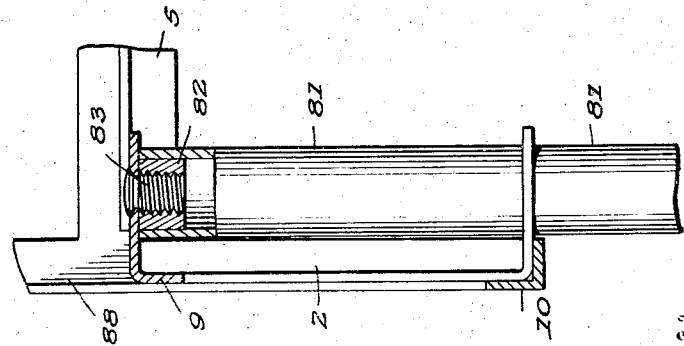

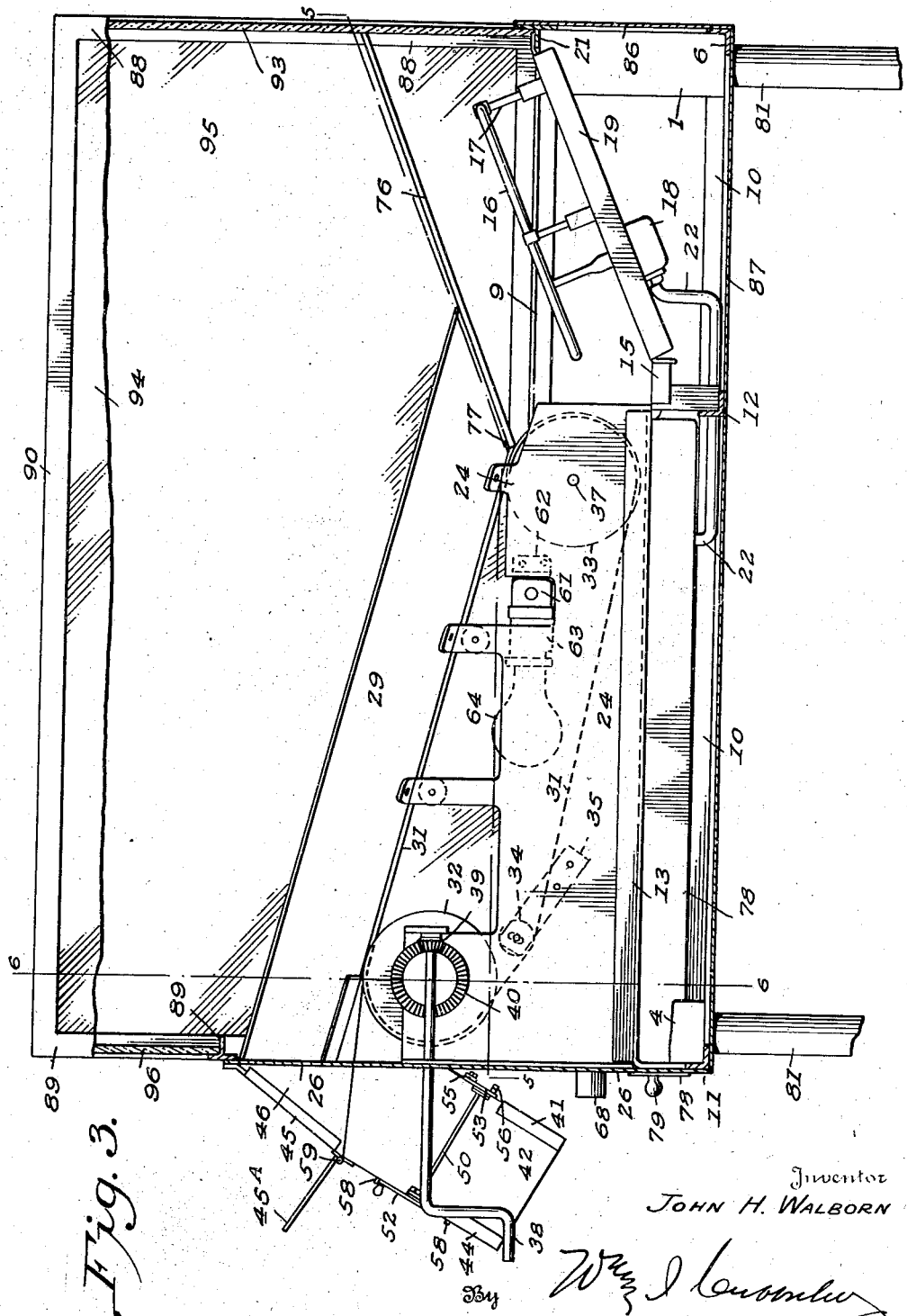

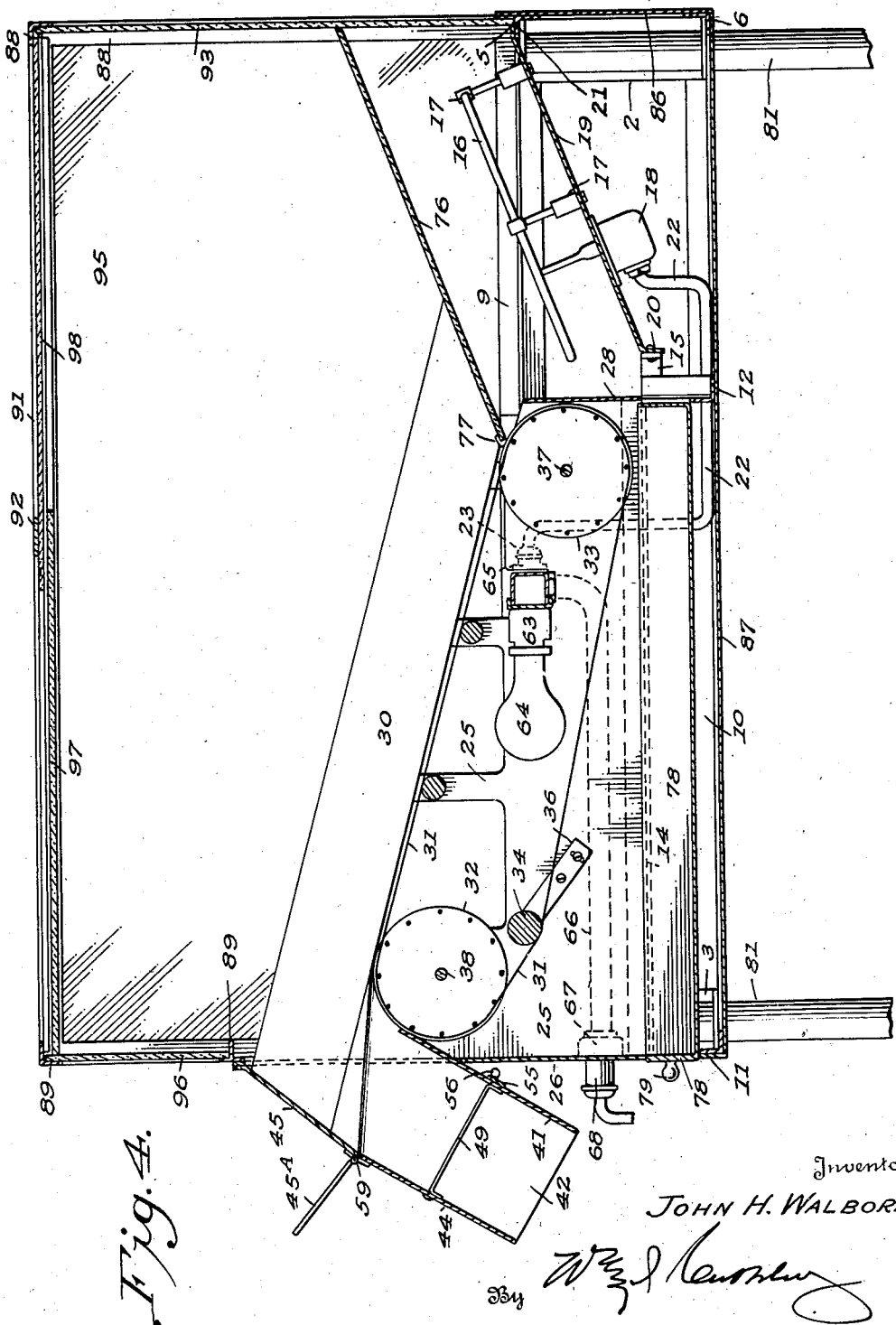

MODERN FOOD DISPENSING AND DISPLAY CASE

Filed Oct. 9, 1941  9 Sheets-Sheet 5

Inventor
JOHN H. WALBORN

By
Attorney

July 31, 1945. J. H. WALBORN 2,380,712
MODERN FOOD DISPENSING AND DISPLAY CASE
Filed Oct. 9, 1941 9 Sheets-Sheet 7

Inventor
JOHN H. WALBORN
By
Attorney

July 31, 1945.  J. H. WALBORN  2,380,712
MODERN FOOD DISPENSING AND DISPLAY CASE
Filed Oct. 9, 1941  9 Sheets-Sheet 8
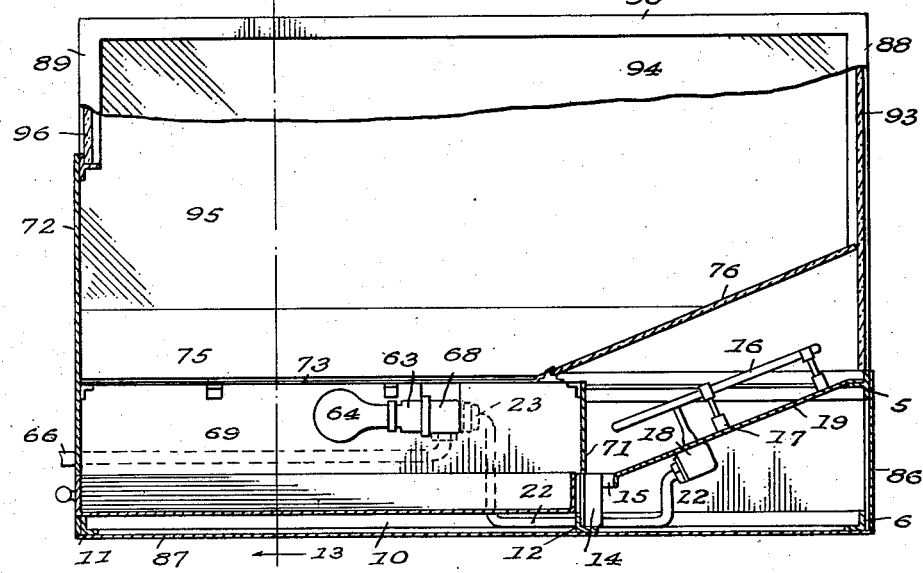
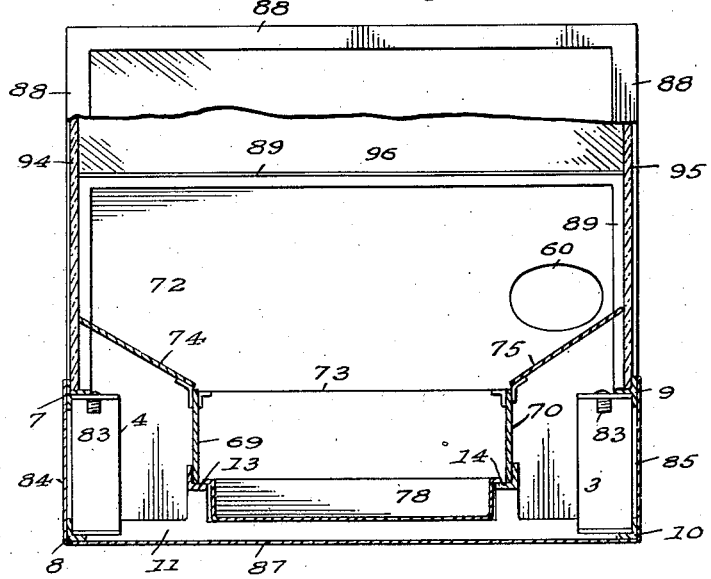
Inventor
JOHN H. WALBORN
By
Attorney

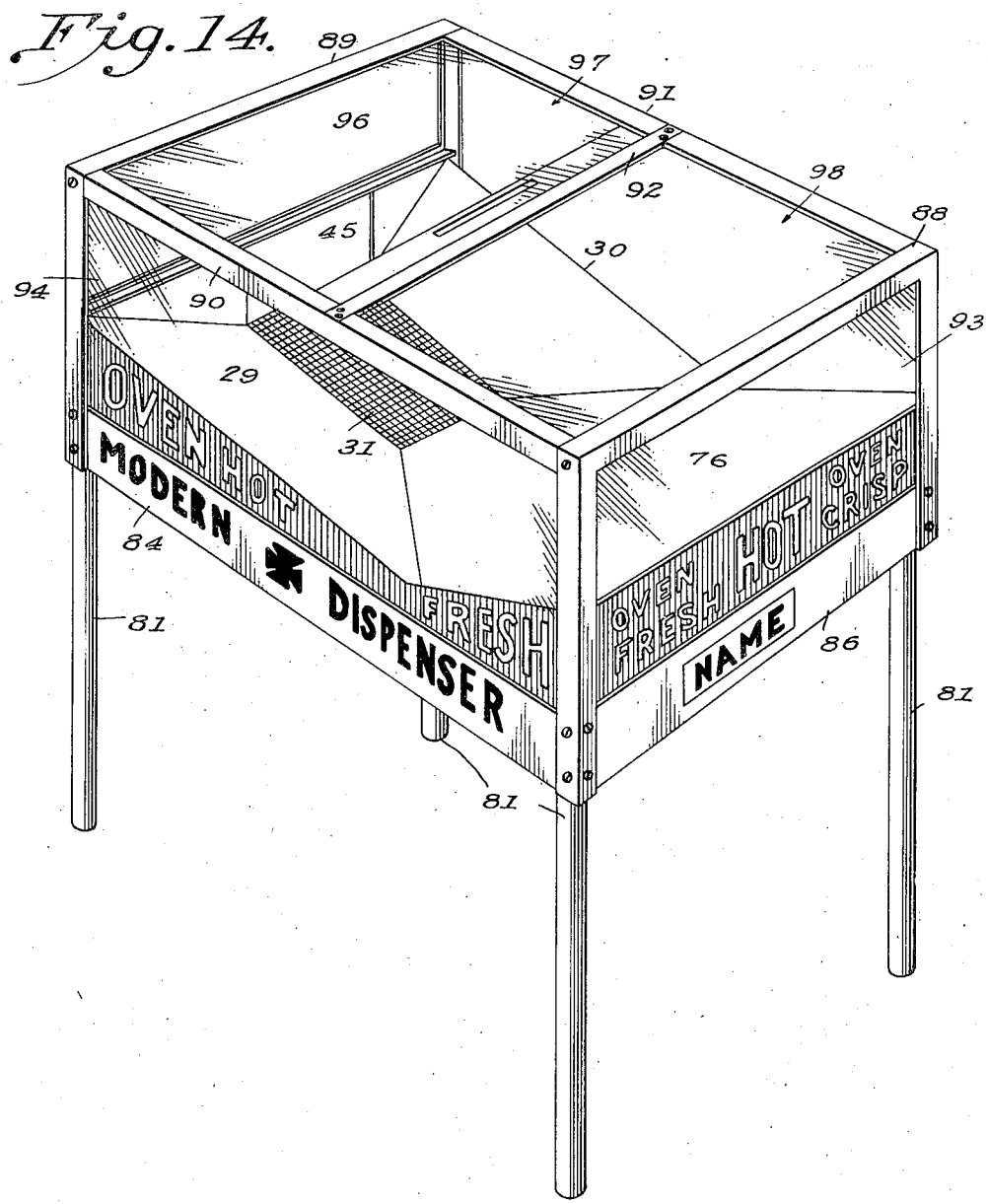

Patented July 31, 1945

2,380,712

UNITED STATES PATENT OFFICE 2,380,712

MODERN FOOD DISPENSING AND DISPLAY CASE

John H. Walborn, Harrisburg, Pa.

Application October 9, 1941, Serial No. 414,387

3 Claims. (Cl. 34—88)

My invention relates to improvements in modern food dispensing and display cases; particularly, a case for storing, warming, displaying, dispensing and advertising food products, such as pretzels, pretzel sticks, potato chips, pop-corn, nuts, baked foods or such foods which would be benefited by warm dry storage while in the saleable condition; or a case for storing, displaying, dispensing and advertising any foods which do not require a warm temperature while in a saleable condition.

Although my invention is here shown in a particular embodiment with respect to size, form, shape, mechanical arrangement and construction of parts, it is to be distinctly understood that changes can and may be made without departing from the spirit of my invention or its broad concept. It is apparent that, although I specifically refer to my invention as a modern food dispensing and display case, my invention, in its broad concept, is applicable to an unlimited number of uses and for a wide variety of commodities.

In the past, many foods, for example, pretzels, were delivered to the stores or market in containers, such as boxes, cartons and cans. It has been the general practice of the retail merchant to place these containers on shelves and counters, and in this way display, store and offer the product for sale to the consumer. In many instances the consumer has access to the handling of the food product, which was objectionable from a health standpoint. It was also necessary for the retailer to handle the product in weighing or bagging when making a sale, which was very unsanitary. Products, such as pretzels, were subject to damage, caused by atmospheric conditions, due to the many unsatisfactory containers used for storage, and, because of these conditions in a majority of the consumer purchases, the product was in an inferior condition. The containers used heretofore never permitted the proper advertising and display of the products when being presented for sale to the consumer, which was a detriment to a satisfactory expansion in the consumption of the products.

Food dispensing and display cases, although not entirely new to the industry, have not proven satisfactory under all and varied conditions. The majority of the patented inventions of cases are produced so as to apply to a specific article or product, and none of these cases are suitable for products such as pretzels and products of a similar nature.

I submit a case of structural shape, which embodies the use of glass in its several sides and top, and in this way provide a means for the proper display of the products stored therein. The case is supported on removable legs, which will permit elimination of the legs when circumstances are most satisfactory for supporting the case on a counter, table or other suitable means. The glass, aside from providing a view of the products in the case, also provides a means for placing transparent printed information, which would be of a subject pertaining to the article contained in the case. There is inserted in the front midsection of the case a suitable lighting means, which directs its rays through the transparent printed information on the glass, thereby providing an attractive and very legible means for reading the printed information. A lower section of the sides and front of the case is provided with aprons which supply a cover means of the inner construction of the case and further additional means for printed information of a nature suitable to the product contained in the case.

A most important feature of my invention is a mechanical unit which is inserted into the case from the back, and, at the same time, provides a cover for a greater section of the back side of the case. Embodied in this mechanical unit is a conveyor that provides, by manual operation, a semi-automatic mechanical means for removal of the products from the case to a suitable container, when making a sale of the products, thereby reducing to a minimum the product being handled by the human hands; a number of chutes and guides of predetermined shapes and positions to provide the proper travel of the products when the conveyor is in motion; a shut-off method that provides a stoppage of the movement of the products into a container, when it becomes filled while unloading the case; a series of electric light bulbs located at a predetermined position between the conveyor belt, which is of porous construction, permitting the heat radiating from the electric light bulbs to pass upward through the belt circulating throughout the space inside the case, and providing a warm atmosphere which is most satisfactory for many products, particularly pretzels, etc., also the light rays from the light bulbs are directed through the glass sides of the case, and thereby supplies additional lighting through the transparent printed matter on the case side glasses; a sliding pan or drawer which provides a means for receiving crumbs, salt, etc., that should not be mixed with the products when sold, and which falls through the porous conveyor belt, where it accumulates over a period of time, and is removable at convenient intervals; a hand hole opening which is covered by a hinged door that permits easy access into the mechanical unit compartment for replacement and adjustment of the electric light bulbs; a hinged lid on the back of the mechanical unit which, when opened, provides convenient access to the food compartment, so that when an excess quantity is mechanically conveyed from the case, the operator can very easily return to the case such amounts as he or she desires; a funnel or spout on the outside rear plate of the mechanical unit which has means for providing attachments suitable for use with the containers which the attendant wishes to fill.

In my invention is also provided a glass plate which is inclined at a predetermined angle in the front of the case, adjacent to the mechanical conveyor which serves as a support for the pretzels or food products, and is responsible for the proper distribution of the pretzel or food products on to the conveyor belt, while the glass permits filtration of the light rays upward through the pretzels or food products, producing a very attractive effect.

My invention also provides facilities whereby the mechanical unit is inserted into the case and supported on the tracks. This permits replacing the mechanical unit with a much cheaper unit that comprehends a flat screen and co-operating metal guards with several electric light bulbs located at a predetermined position under the screen so as to provide the identical lighting and heating effect obtained with a case containing the mechanical unit.

It is to be understood in the detailed description annexed hereto, and in applying the principles of construction of the various parts, as shown in the drawings forming a part of this application, that all rights are reserved with regard to making changes in construction, form, arrangement, size, positions, or relationship of parts, provided such changes fall within the broad concept of my invention, and provided such changes fall within the scope and interpretation of the claims appended hereto, and forming a part of this application.

In the drawings, wherein I have shown one form of my invention, for purposes of illustration, Figure 1 is a plan view.

Figure 2 is a front elevation.

Figure 3 is a longitudinal sectional elevation on line 3—3 of Figure 1.

Figure 4 is a longitudinal section on line 4—4 of Figure 1.

Figure 9 is a detail of the leg attachment.

Figure 10 is a detail of the anchoring device for the slanted glass.

Figure 11 is a detail of the extension for the chute.

Figure 12 is a vertical longitudinal section of a modified form of the case with the conveyor mechanism and the like removed.

Figure 13 is a cross section on the line 13—13 of Figure 12 of the form shown in Figure 12.

Figure 14 is a perspective to more fully illustrate the relative position of the transparent printed matter and to show the general outside appearance of the case.

Figure 5:
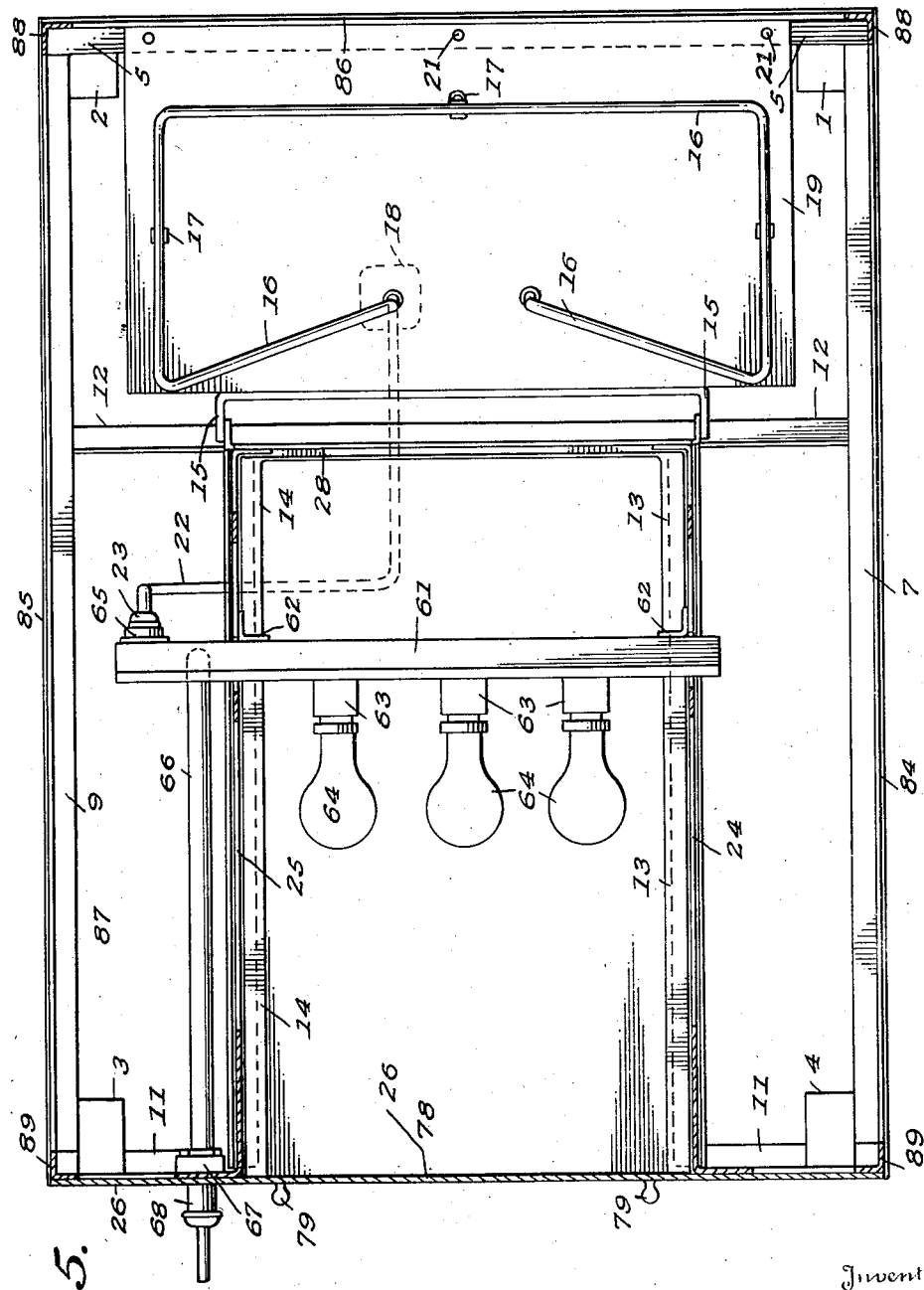
Figure 5 is a sectional view on line 5—5 of Figure 3.
Figure 6:
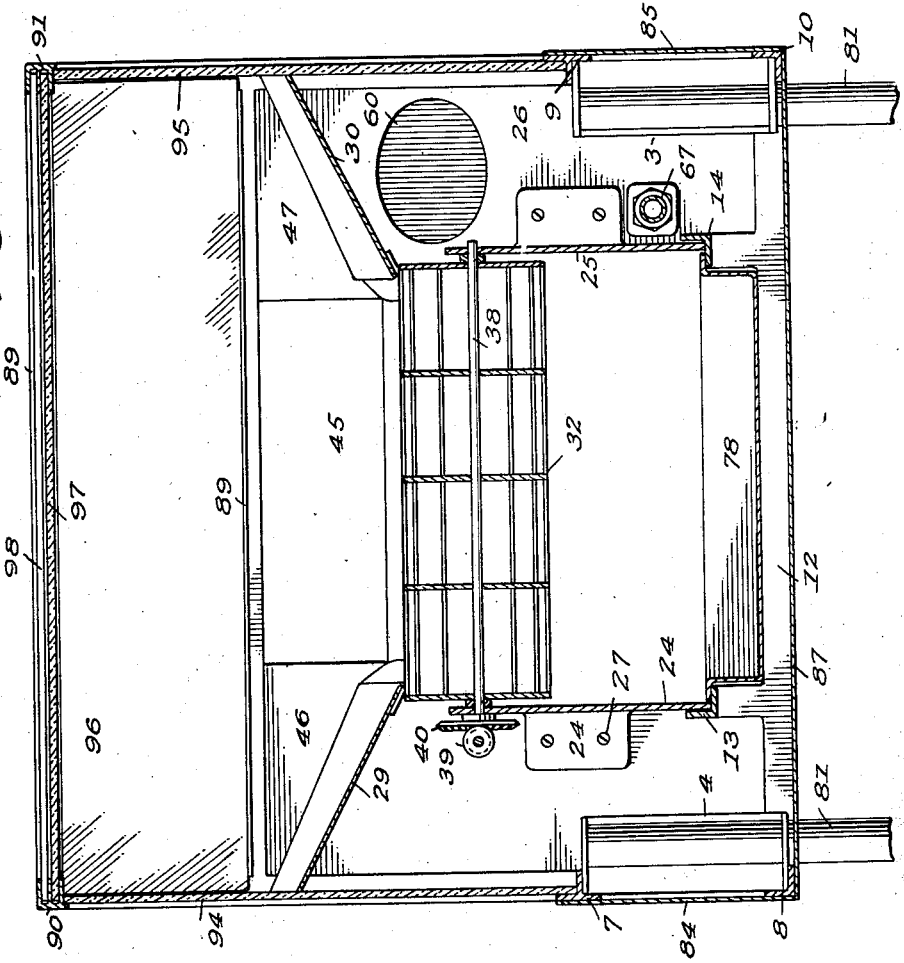
Figure 6 is a section on line 6—6 of Figure 3.
Figure 7:
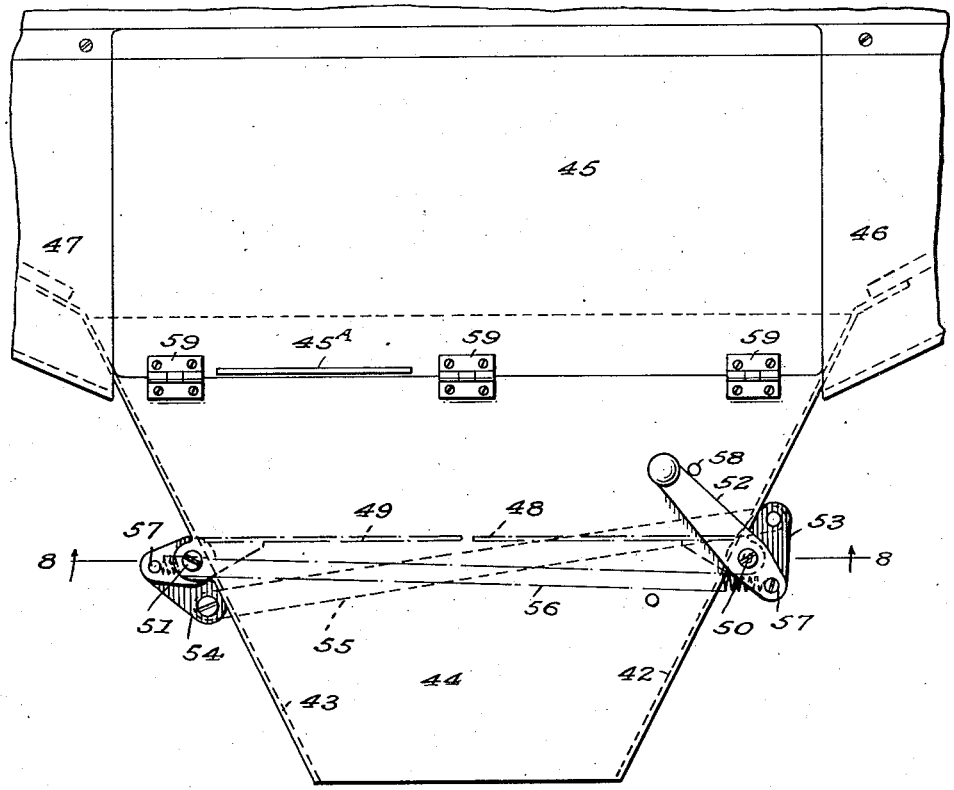
Figure 7 is an enlarged front elevation of the chute and release or door operating mechanism.
Figure 8:
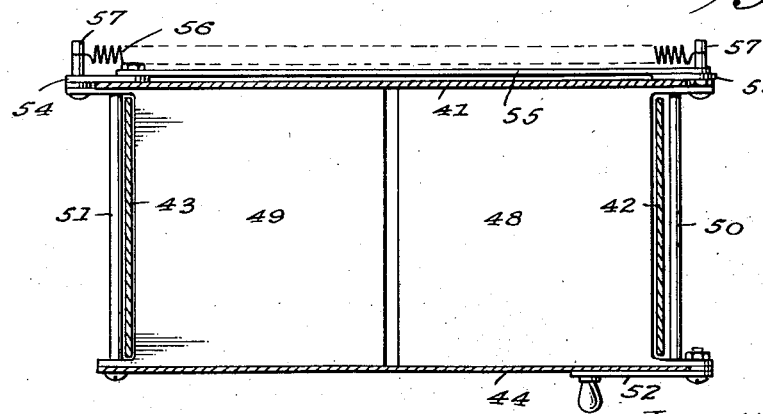
Figure 8 is a section on the line 8—8 of Figure 7.

Throughout the several views of the drawings similar reference characters are used to designate like or similar parts, and to impart an understanding of my invention to one skilled in the art. The following is descriptive of the construction of my invention throughout its complete operation, like marks of reference corresponding to the marks on the accompanying drawings:

Referring to the various figures shown, my case is constructed with a rectangular base or frame, which comprises four formed corner brackets 1, 2, 3 and 4, that are joined together with several angle shaped tie pieces to form the sides. Tie pieces 5 and 6, affixed at their ends to corner brackets 1 and 2, provide a structural front. Tie pieces 7 and 8, affixed at their ends to corner brackets 1 and 4, provide a structural left side. Tie pieces 9 and 10, affixed at their ends to corner brackets 2 and 3, provide a structural right side. Tie piece 11, affixed at its ends to corner brackets 3 and 4, provide a structural rear side. Tie piece 12 is affixed at its ends to tie pieces 8 and 10; thus I have a frame which provides a convenient means for the support, alignment and assembly of the relative parts that constitute my invention.

For the support of my mechanical unit, I provide two tracks 13 and 14, which are attached to the piece 11, and extend forward, attaching to tie piece 12.

For the partial support of my neon lighting assembly, I provide a mounting bar 15, which is rigidly mounted at its ends to the front ends of tracks 13 and 14. Neon tube 16, supported on insulators 17, and transformer and flasher 18, are all assembled to plate 19, which is attached at its rear edge to mounting bar 15, with screws 20, and at its front edge to tie piece 5, with screws 21. The neon light is energized by the conductor 22 and plug connector 23.

My mechanical unit is constructed to facilitate easy removal so that it can be replaced with a non-mechanical unit when circumstances require a less costly "food dispensing case."

My mechanical unit consists of a left side plate 24 and a right side plate 25, which are properly spaced apart and attached at the rear to plate 26, with screws 27, while at the front I provide a plate 28, which is integrally attached to provide the proper spacing of plates 24 and 25. The side plates 24 and 25 are slideable, mounted on the two tracks 13 and 14 respectively, and in this way are responsible for the support of the entire mechanical unit. Plate 26 in addition to being the rear side of the mechanical unit is utilized as an outside wall for the greater portion of the rear side of the case. At the top edges of plates 24 and 25 are formed ears which provide the assembly positions for two guide plates 29 and 30.

As a mechanical means for unloading the case, I provide a movable porous conveyor belt 31 which is suitably supported on two revolving drums 32 and 33, with provision for adjustment of the belt 31 by idler roll 34. Idler roll 34 is supported on two adjusting brackets 35 and 36. Drum 33, at the front of the unit, revolves on shaft 37, while drum 32, at the rear of the unit, is mounted on and revolves through the medium of shaft 38. For motive power, I provide a manually operated handle 38 that extends through the rear wall of the case, which permits bearing support, while the front end extension of handle 38 receives bearing support from a formed ear of plate 24. A small pinion 39, integrally mounted on the shaft section of handle 38, is in mesh with a bevel gear 40, which is integraly mounted on rear drum shaft 38. Through the clockwise rotation of handle 38 the top most surface section of porous belt 31 receives a front to rear motion which is responsible for the transferring of the products contained in the case to an unloading or dispensing position at the rear.

Attached to rear plate 26, in a relative position to guide plates 29 and 30, and conveyor 31, I provide a funnel or spout that is constructed of a bottom plate 41, a left side plate 42, a right side plate 43, a top plate 44, a hinged top lid 45, a left side rigidly attached top plate 46 and a right side rigidly attached top plate 47. These parts conform in providing a tapered box shaped funnel or spout, which is instrumental in guiding the products into containers when being dispensed from the case. Contained inside the tapered box like spout is a pair of shut-off doors 48 and 49 that have formed ears which protrude through slots in side plates 42 and 43, and in this way facilitate mounting on and oscillating movements by shafts 50 and 51. The shafts 50 and 51 are supported in bearings that are extended sections of bottom plate 41 and top plate 44. Shut-off doors 48 and 49 are operated manually through handle 52 which is rigidly attached to shaft 50. On the lower ends of shafts 50 and 51 are rigidly fastened the levers 53 and 54, which are connected to an operating bar 55, and in this way provide a synchronized movement of the doors 48 and 49 when handle 52 is oscillated. Spring 56 mounted to studs 57 on levers 53 and 54 provide the means for staying the doors 48 and 49 in either the open or closed position and studs 58 attached to spout top plate 44 provide the stopping points for the handle 52, when the doors 48 and 49 are in the open or closed position.

The top lid 45 is suitably connected to the top plate 44 with three hinges 59 to provide a means for obtaining access to the rear of the case by moving handle 45—A of lid 45.

The hand hole cover 60 which is attached to rear plate 26 with the screws 61 permits easy access to the mechanical unit for adjustments and light bulb changes.

At a predetermined position between the conveyor belt 31, I provide a series of light bulbs that supply both heat for warming the inside area of the case and light for illumination of the lower section of the glass sides of the case.

Wire molding 61 is attached to unit side plates 24 and 25 with brackets 62, and provides a mounting place for porcelain receptacles 63, which are suitable for common electric light bulbs 64. At the right end of molding 61, on the front side, is provided a plug receptacle 65 for receiving plug connector 23 as a means for supplying power to the neon lighting. Near the right end of molding 61, on the rear side, is connected a section of conduit 66 that extends to the rear plate 26 where I provide a female receptacle connection 67 that is suitable for making connection with a male connector plug 68, which can be used on a standard portable extension conductor. The proper power conductors are attached to connector 67, located inside conduit 66, and wire molding 61, making connection at receptacle 65 and porcelain receptacles 63, and in this way supply electrical current where required.

Having described my mechanical unit, which can be slidably removed from the case, in drawer like movement, I will now describe a cheaper non-mechanical unit which can replace it when a much cheaper case is desired.

Referring to Figures 12 and 13, making use of the tracks 13 and 14, and slidable position side plates 69 and 70, which are attached at the front to plate 71 and at the rear to plate 72, forming a rectangular drawer shaped structure which utilizes a flat screen 73, attached along the top edges of plates 69, 70 and 71, and to rear plate 72, also at the top edges of plates 69 and 70, I provide the guide plates 74 and 75, which extend in a slanted position over to the glass sides of the case. I provide an electrical unit identical with that used in my mechanical unit, which provides the same heating and illuminating results as that obtained in a case with the mechanical unit.

Closely related to my mechanical and non-mechanical units in the front of the case is a slanted plate glass 76, which is positioned and supported at its rear edge by the brackets 77, attached to the pieces 7 and 9, while the front edge of glass 76 rests against the inside of the case front side glass.

I provide a drawer 78, positioned directly under the mechanical or non-mechanical units on the tracks 13 and 14 to receive the crumb materials which fall through the porous belt or flat screen. The knobs 79, attached to drawer 78 are the means provided for withdrawing the drawer 78.

The spout or funnel on the rear of the unit is provided with means for attaching various sizes of adaptors such as adaptor 80, shown on Figure 11. This permits using the type and style of adaptor required for the product being dispensed.

My case can either be placed on a table or counter or be supported by four tubular legs 8 which are easily attached as shown in Figure 9. Tubular legs 81 have female threaded inserts 82 that screw on threaded studs 83 which are rigidly attached to the case corner brackets 1, 2, 3 and 4.

Around the structural base of my case I attach apron 84 on the left side, apron 85 on the right side, and apron 86 on the front side. In this way I cover the inner construction and mechanical workings of my case, and at the same time provide a surface for placing printed advertising or trade names.

A bottom sheet 87, attached to the case structural base, provides a flat protective surface for the entire bottom of the case.

Since the greater portion of the upper part of my case is of glass construction, I provide a frame for supporting the glass. At the front of the case I provide frame 88, having two legs and a transverse top section, which are formed from one piece of angle shaped material, the two legs being attached to the two front corner brackets 1 and 2. At the rear of the case I provide a frame 89, having two legs, a transverse top section and a transverse mid-section, which are formed from one piece of angle shaped material, the two legs being attached to the two rear corner brackets 3 and 4. Along the full length of the case is a left side top bar 90 and a right side top bar 91 that attach at their ends to front frame 88 and rear frame 89. A tie bar 92 attaches to and extends from left side top bar 90 to right side top bar 91. Assembled in this frame work is front glass 93, left side glass 94, right side glass 95 and rear side glass 96. The bars 90 and 91 are provided with slots along their entire length to permit rigid support of rear top glass 97 and to permit sliding and support of front top glass 98.

On the perspective drawing, Figure 14, can be seen the space provided along the lower sections of the front side glass 93 the left side glass 94, and the right side glass 95, for placing transparent printed matter suitable to the application of the products in the case.

Having described the construction of my "modern food dispensing and display case," I will proceed with a description of its operation.

A case having a mechanical unit is filled with food products through an opening in the top, provided by sliding top glass 98 toward the rear of the case. The products are poured into the case, falling on the slanted glass 76, tumbling toward the rear of the case, covering the porous belt, and piling up until the case is full. The sliding glass 98 is then pushed forward to the closed position. The electric current turned into the electrical unit lights up the case through the bulbs 64 and the neon light tube 16. The slanted glass 76 is slightly frosted to prevent seeing the case parts, but is transparent enough to permit the neon light rays passing upward through the glass 76, and then through the food products to present a very attractive display. These same neon light rays pass outward through transparent printed matter on the lower sections of the case side glasses 93, 94 and 95. Since the neon lighting is provided with a flasher, and the neon tube mounting plate 19 has a special reflecting surface, this presents a maximum of lighting effect with an attracting intermittent lighting effect. The bulbs 64 also direct their rays through the transparent printed matter on the lower sections of side glasses 94 and 95, and furnish continuous lighting effects while the light rays pass upward through the porous belt 31, making possible a continuous lighting effect through the food products. The heat radiating from light bulbs 64 passes upward through the porous belt 31 and is responsible for heating the inside area of the case, which provides a warmed food product. The temperature is controlled either with the proper sizes of light bulgs 64 or a common thermostatic automatic control can be utilized when mounted inside the case and connected to the lighting circuit.

When the attendant wishes to dispense the food product he or she places a suitable container under the spout or funnel at the rear of the case, moves handle 52 downward to open doors 48 and 49, turns handle 38 clockwise until the porous belt 31, moving rearward, has delivered the required amount of food products into the container. When the container is filled to the required amount, the attendant stops turning handle 38 and moves handle 52 upward, closing doors 48 and 49. If the container has received more than the required amount, the excess is returned to the case through the opening provided by pushing down on hand grip 45—A of hinged door 45. When the excess has been returned to the case, hinged door 45 should again be closed to prevent escape of the heat.

All food products can be emptied from the case by the above explained method as guides 29 and 30, and slanted glass 76, co-operate with each other in feeding all food products on to the porous conveyor belt 31.

A case having a non-mechanical unit is filled with food products by resorting to the same methods explained for the case having the mechanical unit. In order to unload the non-mechanical case, the attendant is compelled to manually lift the food products out of the same top opening and place them in the container. The heating and lighting effects are the same with the non-mechanical unit case as with the mechanical unit case.

Although my invention describes the use of electric light bulbs for heating and illuminating my case, it is to be distinctly understood that various other types and methods of heating and illuminating my case can be used without departing from the original concept of my invention.

From the foregoing it is believed that the construction and operation of the various parts, the adjustments and changes of the case, and the advantages of my unique invention will be apparent, and in conjunction therewith it is again pointed out that any number of these cases may be set up and operated, depending on the quantity and different types of products to be stored, displayed or offered for sale.

It is again pointed out that changes may be made in size, form, shape, mechanical arrangement, and construction of the parts without departing from the spirit of my invention or its broad concept. Furthermore, while a single unit case of a certain number and arrangement of parts, operating and adjustment structure has been shown and described herein, it is manifest that variations in practical application will dictate and perhaps necessitate changes in timing, organization and the like, to conform to necessities of the individual application and merchandising practices; therefore, in interpreting the scope of my invention, reference is to be had to the subjoined claims.

I claim:

1. A pretzel heater, display and dispensing device comprising a receptacle for the food product, a top for said receptacle formed with movable sections to give access to the interior, a conveyor at the bottom of the receptacle, a dispensing device for the food product associated with the receptacle and communicating with the interior thereof adjacent the conveyor and formed with a cut-off means having devices for returning the same to closed position, a supplementary floor device supporting the food products in spaced relationship to the bottom of the receptacle, and heating and illuminating means between the bottom and the floor.

2. A combined pretzel heater, illuminating and display device comprising a receptacle having tracks in the interior thereof, a conveying unit and a dispensing unit movably and removably mounted on the tracks, a supplementary floor for the pretzels, heating and illuminating devices beneath the floor, reflecting means consisting of a mirror located beneath the heating and illuminating devices, and the floor formed to urge the bulk of the pretzels toward a common point by gravity, said conveying unit being arranged to receive the pretzels at the common point and convey the same to the dispensing unit and said receptacle being formed with opaque and transparent parts, and the pretzels being visible through the transparent parts.

3. A food display and dispensing device comprising a food retaining receptacle having sides, a top, a bottom and ends, said food retaining receptacle having removable legs to adapt the same to separate support and to be supported on a counter, the top being formed with movable sections to give access to the interior, transparent panels through which the food product is visible, a supplementary bottom part, reflecting means consisting of a mirror beneath and spaced from the supplementary bottom part, heating and illuminating means beneath the supplementary bottom and subject to the reflecting action of the mirror, the supplementary bottom part supporting the food product in operative relationship to the heating and illuminating elements, a dispensing device located adjacent the top of the receptacle and at one end thereof, and an inclined conveyor element extending from the low point in the supplementary bottom to the dispensing device, and said conveyor being of porous construction having openings of such a size as to prevent passage of food products but to screen out refuse particles and permit passage of heat and light to said food products.

JOHN H. WALBORN.